United States Patent [19]

Anderson

[11] Patent Number: 4,554,762
[45] Date of Patent: Nov. 26, 1985

[54] ELECTRICALLY POWERED SUN BLIND

[76] Inventor: Robert W. Anderson, Hexham House, Shields Rd., Cleadon Village, South Shields, Tyne & Wear, England

[21] Appl. No.: 722,418

[22] Filed: Apr. 12, 1985

Related U.S. Application Data

[63] Continuation of Ser. No. 472,480, Mar. 7, 1983, abandoned.

[51] Int. Cl.⁴ .............................................. E06B 7/086
[52] U.S. Cl. ............................................ 49/76; 49/64
[58] Field of Search .................. 49/64, 62, 75, 83, 74, 49/76, 82, 83, 84, 403, 349, 334, 340

[56] References Cited

U.S. PATENT DOCUMENTS

| | | | |
|---|---|---|---|
| 1,871,557 | 8/1932 | Racy | 49/64 X |
| 2,565,979 | 8/1951 | Michaelsen | 49/64 X |
| 2,617,157 | 11/1952 | Olson | 49/76 |
| 2,657,923 | 11/1953 | Coppage | 49/62 X |
| 2,675,227 | 4/1954 | Baird et al. | 49/82 X |
| 2,693,010 | 11/1954 | Anderson | 49/64 X |
| 2,981,538 | 4/1961 | Bennett | 49/83 |
| 3,068,971 | 12/1962 | Ringler | 49/82 X |
| 3,685,205 | 8/1972 | Requena | 49/64 |
| 3,742,646 | 7/1973 | Piech | 49/349 X |

FOREIGN PATENT DOCUMENTS 742840 1/1956 United Kingdom .................... 49/64

Primary Examiner—Philip C. Kannan
Attorney, Agent, or Firm—Collard, Roe & Galgano

[57] ABSTRACT

A sun blind for motor vehicles including a plurality of horizontally extending slats (2) supported by "ladder" assemblies (4) including rigid side pieces (6) and cross-pieces supporting and locating the slats. An electric motor (10) is connected between the ladder assemblies and a fixed mounting point in such a way that rotation of the motor causes the angle of the slats to be varied. An automatic control circuit opens the blind whenever the ignition of the vehicle is switched on and closes it at a predetermined time after the ignition is switched off.

8 Claims, 7 Drawing Figures

SUN CONTROL CENTRE - CONTROL UNIT SCHEMATIC.

ELECTRICALLY POWERED SUN BLIND

REFERENCE TO RELATED APPLICATIONS

This is a continuation application of application Ser. No. 472,480, filed Mar. 7,1983, for "Electrically Powered Sun Blind", now abandoned.

This invention relates to sun blinds, and particularly to sun blinds of the type which comprise a plurality of parallel slats each of which is adapted to swivel about a longitudinal axis, so as to vary the amount of light which is admitted through the blind.

According to a first aspect of the present invention, there is provided a sun blind comprising a plurality of parallel slats, and at least two "ladder" elements arranged to support the slats, each ladder element comprising a pair of parallel side pieces interconnected by a series of cross pieces whose ends are pivoted to the side pieces in such a way that the side pieces are able to move parallel to one another. Thus, in use, when the side pieces of the ladder elements are moved relative to one another, the angle of the cross pieces and thus the angle of the slats is adjusted.

Preferably the side pieces are moulded from a suitable plastics material such as "Noryl" (R.T.M.). In order to stiffen the ladders in the case of a large rear window, a pair of C-section metal extrusions (for example of aluminium) may be provided for each "ladder", which are of such a size and shape that they slide over the side pieces.

Preferably, each cross piece is so shaped and constructed as to cooperate with the side pieces and/or the adjacent cross pieces, so as to form an integral limiting mechanism, to limit the range of angular adjustment of the blind.

In the case of a very wide window, an extra "ladder" assembly may be provided so as to provide additional support for the central sections of the slats.

Preferably, the relative movement of the side pieces is achieved by means of an electric motor whose output is geared down and which is so connected between a cross piece of one of the ladder assemblies, and a fixed mounting point, that rotation of the output shaft causes relative pivoting of the crosspiece and side pieces. For example, the casing of the motor may be connected to the lowermost crosspiece of the ladder assembly whilst the output shaft of the gearbox is connected to the fixed mounting point; alternatively, this arrangement could of course be reversed, or one of the two relatively moving parts of the motor assembly could be connected to the crosspiece, whilst the other was connected to one of the uprights.

In a preferred arrangement, the motor is provided with automatic control circuitry including a timer circuit which is connected to the ignition system of the vehicle, in use, and is so arranged that the motor is run to open the blind when the car engine is started, and is also run to close the blind automatically, after a predetermined time has elapsed following the engine being switched off. In this preferred control circuit, a manual override switch is also preferably provided so that the blind can also be operated independently of the automatic control.

Preferably, a slipping clutch is arranged between the motor and the gearbox, or between the output of the gearbox and the output of the motor assembly.

In a preferred arrangement of the invention, the crosspieces are generally "Z" shaped, with the pivots at the extreme ends of the Z, and the central member of the Z is formed with notches at each end, to receive and locate the edges of the slats. The slats may be arranged in generally coextensive pairs, which are slidable relative to one another, in the notches of the crosspieces, so that the overall width of the assembly, that is its dimension measured parallel to the length of the slats, is adjustable.

Such an arrangement is particularly suitable for use as a sun blind in the rear window of a car, in which case it is preferably provided with adhesive mounting pads connected to the ladders and adapted to adhere to the inner surface of the glass of the window.

One embodiment of the invention will now be described by way of example, with reference to the accompanying drawings, in which.

Figure 1:
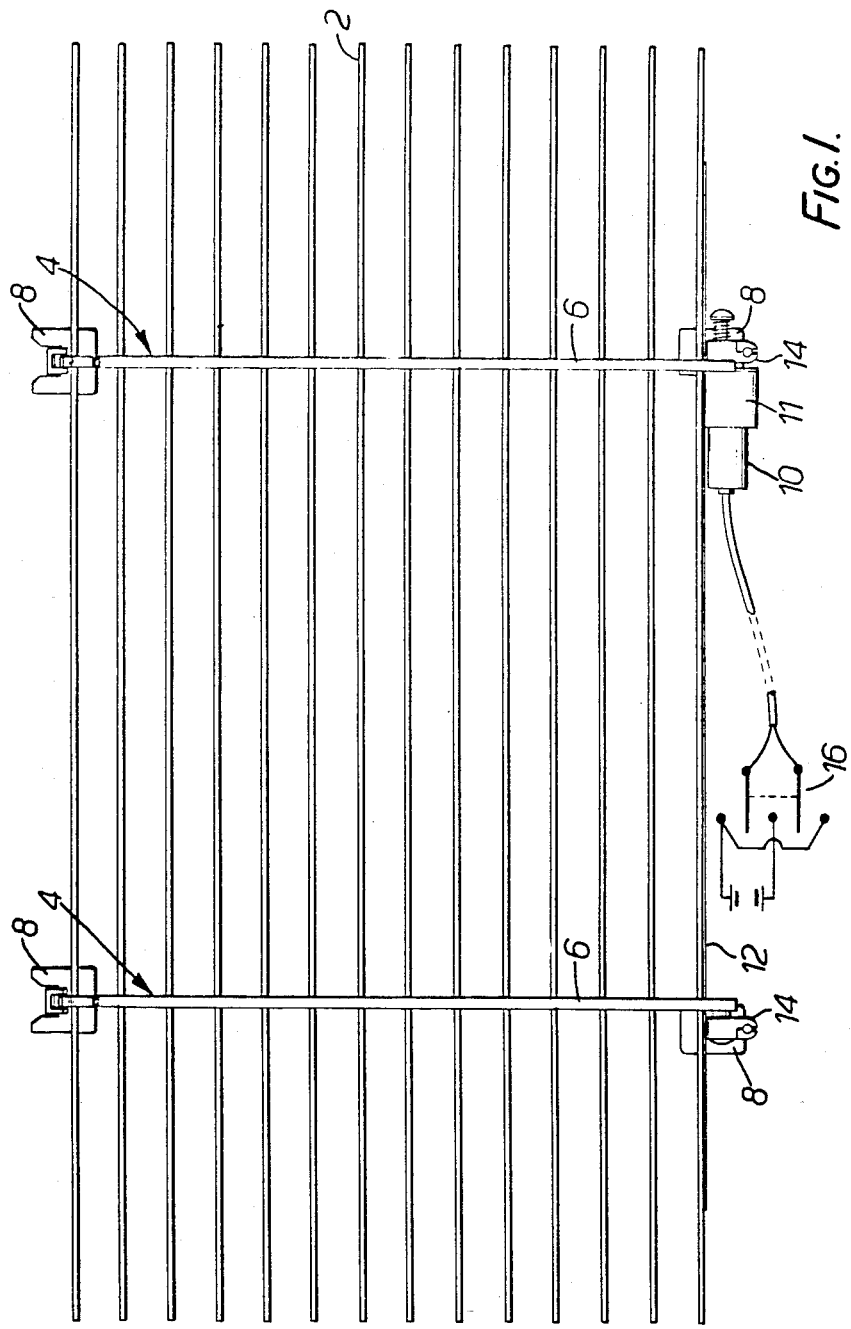
FIG. 1 is a general elevational view of the assembled blind.

Referring to FIG. 1, the blind assembly comprises a plurality of horizontally extending slats 2, which are supported by vertical ladder members 4, whose side pieces 6 are visible in the drawing. The assembly is adapted to be fixed to the rear window of a car by means of self adhesive neoprene pads fixed to brackets 8 which are connected to the top and bottom ends of each ladder assembly. A motor assembly 10 is connected directly to the bottom end of one of the ladder assemblies 4, and via a cross member 12, to the corresponding part of the other ladder assembly. The output shaft of the motor assembly is connected by means of a pivot device 14, to one of the mounting brackets 8, and the bottom end of the other ladder assembly 4 is similarly connected by a corresponding pivot device, to its lower mounting bracket 8. The motor can be made to run in either direction by means of a remotely positioned double pole changeover switch 16, connected to a DC supply.

Figure 2:
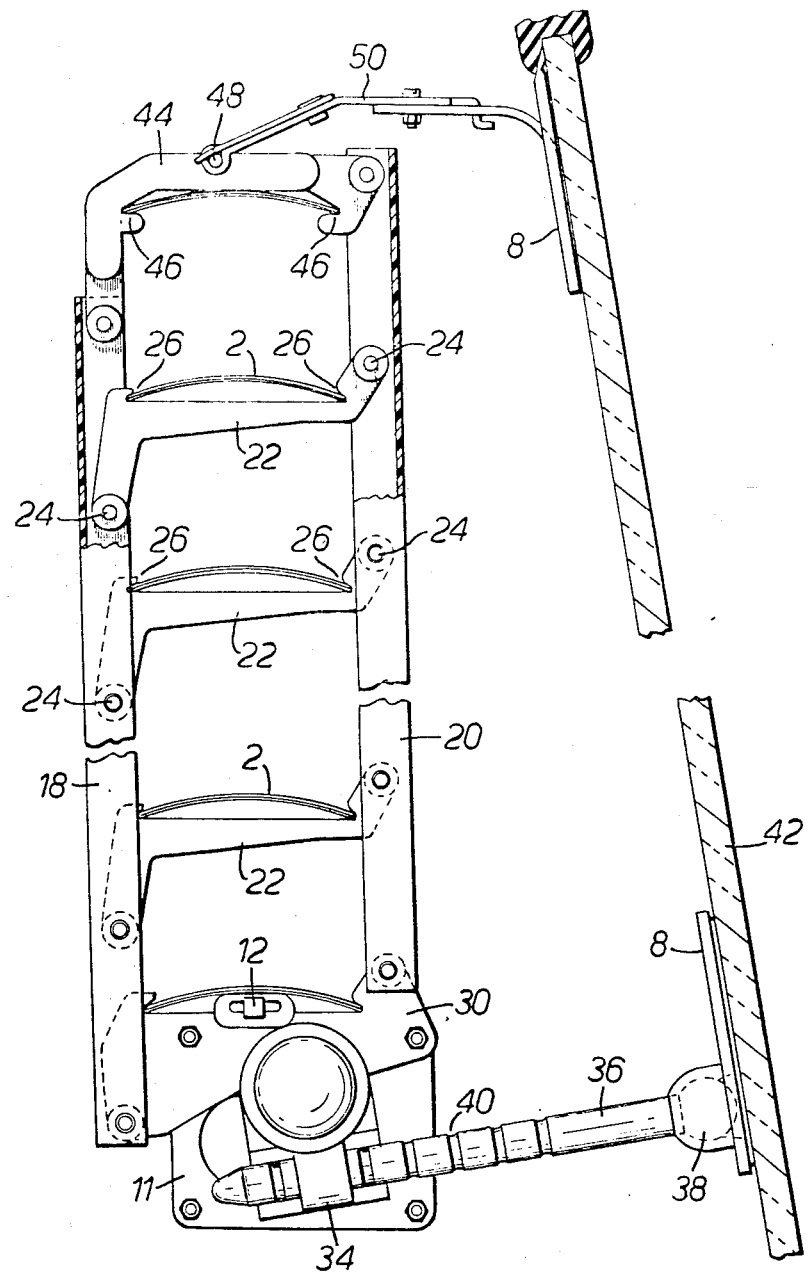
FIG. 2 is a partial side elevation of the assembly of FIG. 1, with the slats of the blind open.
Figure 3:
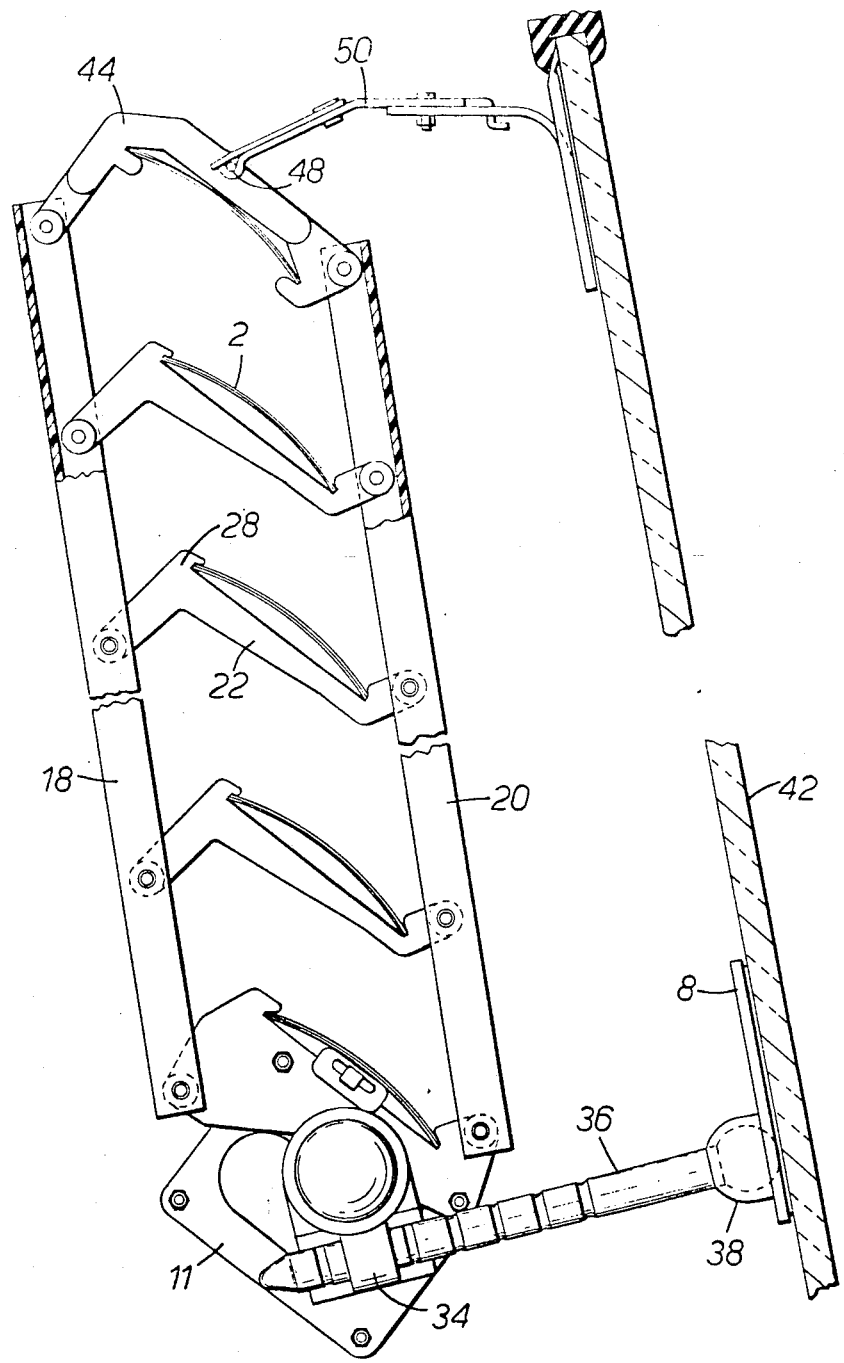
FIGS. 3 and 4 are views similar to the view of FIG. 2, but with the slats respectively in their mid position, and in their closed position.

Referring now to FIG. 2, each ladder assembly 4 comprises a pair of side pieces 18, 20, interconnected by a series of crosspieces 22 which are generally Z shaped, and have their ends connected by means of pivots 24, to the side pieces. Each of the crosspieces 22 is formed with a pair of facing re-entrant notches 26, which receive the edges of the curved slats 2, retaining them in position on the crosspiece. FIG. 3 shows how the crosspieces and the side pieces move relatively to one another, as the blind is moved from the open position shown in FIG. 2, towards the closed position shown in FIG. 4, and as can be seen from FIG. 4, the closing movement of the blind is limited by the abutment of each shoulder 28 of a crosspiece 22, against the underside of the next crosspiece.

Referring once again to FIG. 2, the casing of the motor assembly 10 is bolted to a specially shaped lower cross member 30 which is connected to the side pieces 18 and 20 in the same way as the other cross pieces 22, and also carries a slat 2, in the same way as the other cross pieces, but in addition includes a mounting for a connecting rod 12, seated beneath the slat, which connects the crosspiece 30 to the corresponding crosspiece of the other ladder assembly, as shown in FIG. 1.

Figure 5:
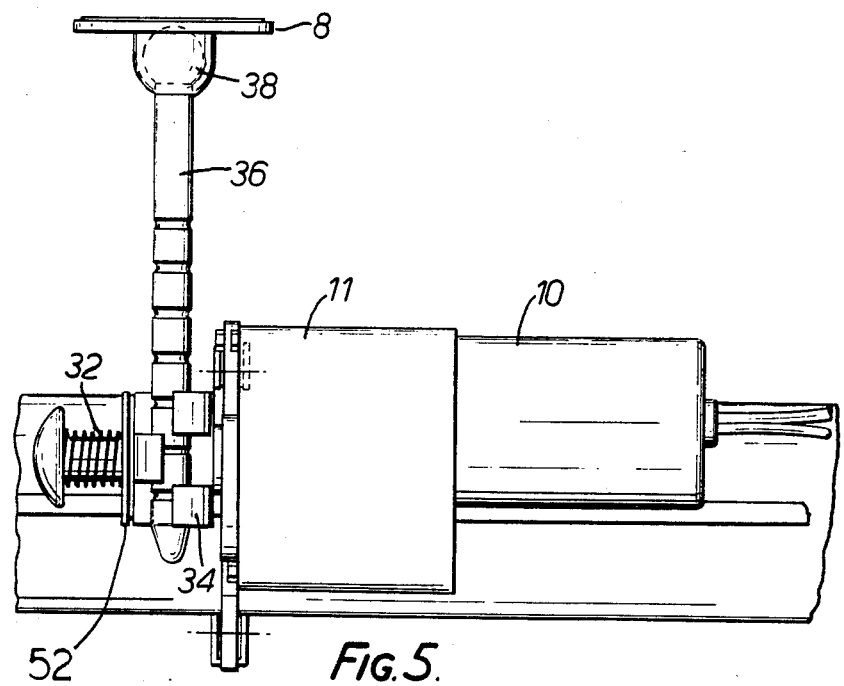
FIG. 5 is an underneath plan view of a portion of the assembly of FIG. 2, which includes the motor.

The motor assembly 10 includes a reduction gearbox 11, with a friction type clutch 52 at its output which is held in engagement by means of a helical spring 32, as shown in more detail in FIG. 5. A bracket 34 is fixed to the output member of the clutch, so as to rotate relative to the motor assembly 10 when the motor runs, and which is a snap-fit upon a specially shaped bracket arm 36 connected by means of a ball and socket assembly 38, to one of the lower mounting pads 8. The bracket 34 is arranged to engage in one of a series of annular grooves 40 on the member 36, so that the distance of the lower part of the blind assembly from the window 42, can be adjusted.

Figure 4:
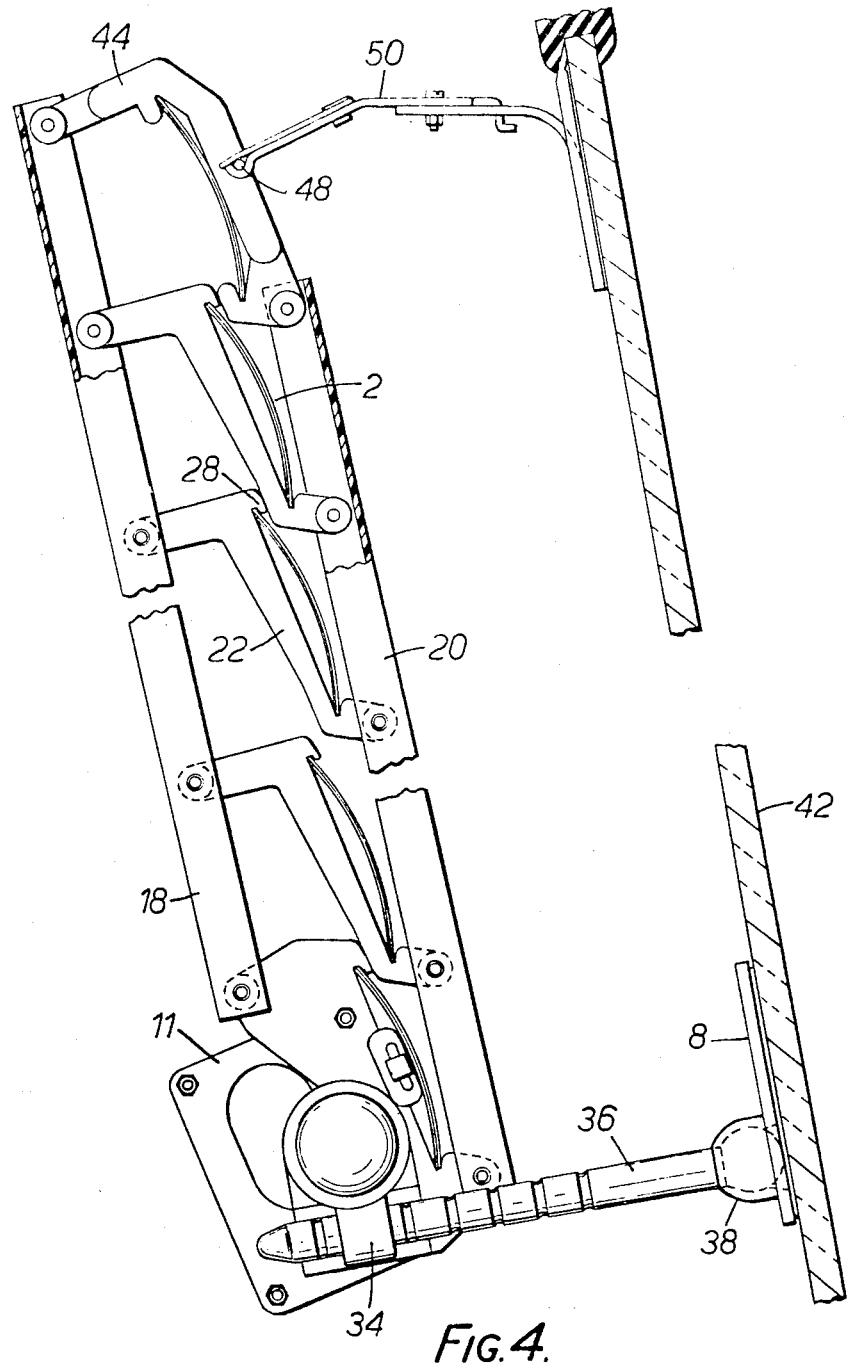

The gearbox 11 of motor assembly 10, as clearly seen in FIGS. 2 to 4, includes crosspiece 30 fixed thereto which moves side pieces 18 and 20 when motor assembly 10 rotates with respect to bracket 34. When the assembly has been moved to the position shown in FIG. 4 and shoulders 28 abut against the next adjacent crosspieces 22, clutch 52 permits slipping between gearbox 11 and the motor output until motor assembly 10 is switched off.

Figure 6:
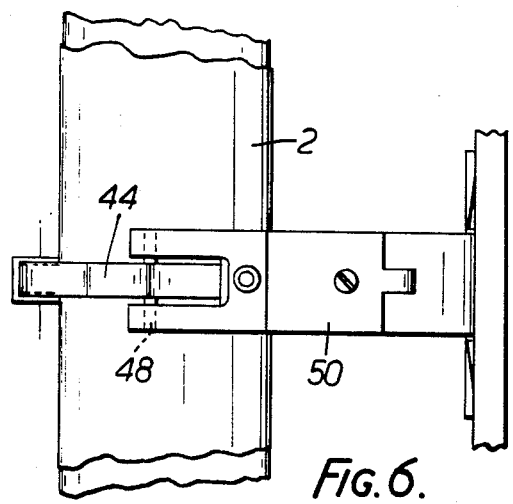
FIG. 6 is a top plan view of a portion of the assembly, showing a mounting bracket.

The upper end of each ladder assembly is connected to its corresponding window bracket 8, by means of a specially shaped top crosspiece 44 which carries the top slat 2, in re-entrant notches 46, in its lower surface, instead of in its upper surface as in the case of the other crosspieces. As shown in FIGS. 2 and 6, a pivot 48 connects the crosspiece 44 to an extension 50 from the top bracket 8, so as to allow the ladder assembly to pivot, relative to the bracket.

In operation, when the changeover switch 16 is closed, with the assembly in the position shown in FIG. 2, the motor casing 10 is progressively rotated, relative to the bracket 34, as shown in FIGS. 3 and 4 thus changing the angle of the slats progressively, to the positions shown in these Figures. Of course, the switch can be opened with the slats in any desired intermediate position. Similarly, when the switch is moved to its opposite closed position, with the slats in the position illustrated in FIG. 4, the blind will of course be opened.

The slats 2 are preferably made of very thin metal, so that a pair of slats may be located in each ladder crosspiece, with the ladders 4 arranged sufficiently close to one another, relative to the length of the slats, to allow the width of the whole assembly to be adjusted by sliding the two slats of each pair, relative to one another. In addition, for ease of installation, the side pieces 18 and 20 are preferably made so that they may easily be cut to length, and the crosspieces snapped into position in order to assemble the ladder. For this purpose, the pivot 24 preferably comprises studs on the ends of the crosspieces, which are a snap-fit in corresponding mounting holes in the ladders. In the preferred arrangement shown, the ladders, the crosspieces, the bracket 34 and the arm 36 are all made of a resilient plastics material, such as nylon, and the arrangement is particularly suitable for installation as a rear window blind for a car. In this case the switch 16 will of course be installed on the dashboard, with power being supplied from the car's battery. The design of the slats and ladders makes it particularly easy to adapt the blind to windows of a wide range of widths and heights.

Figure 7:
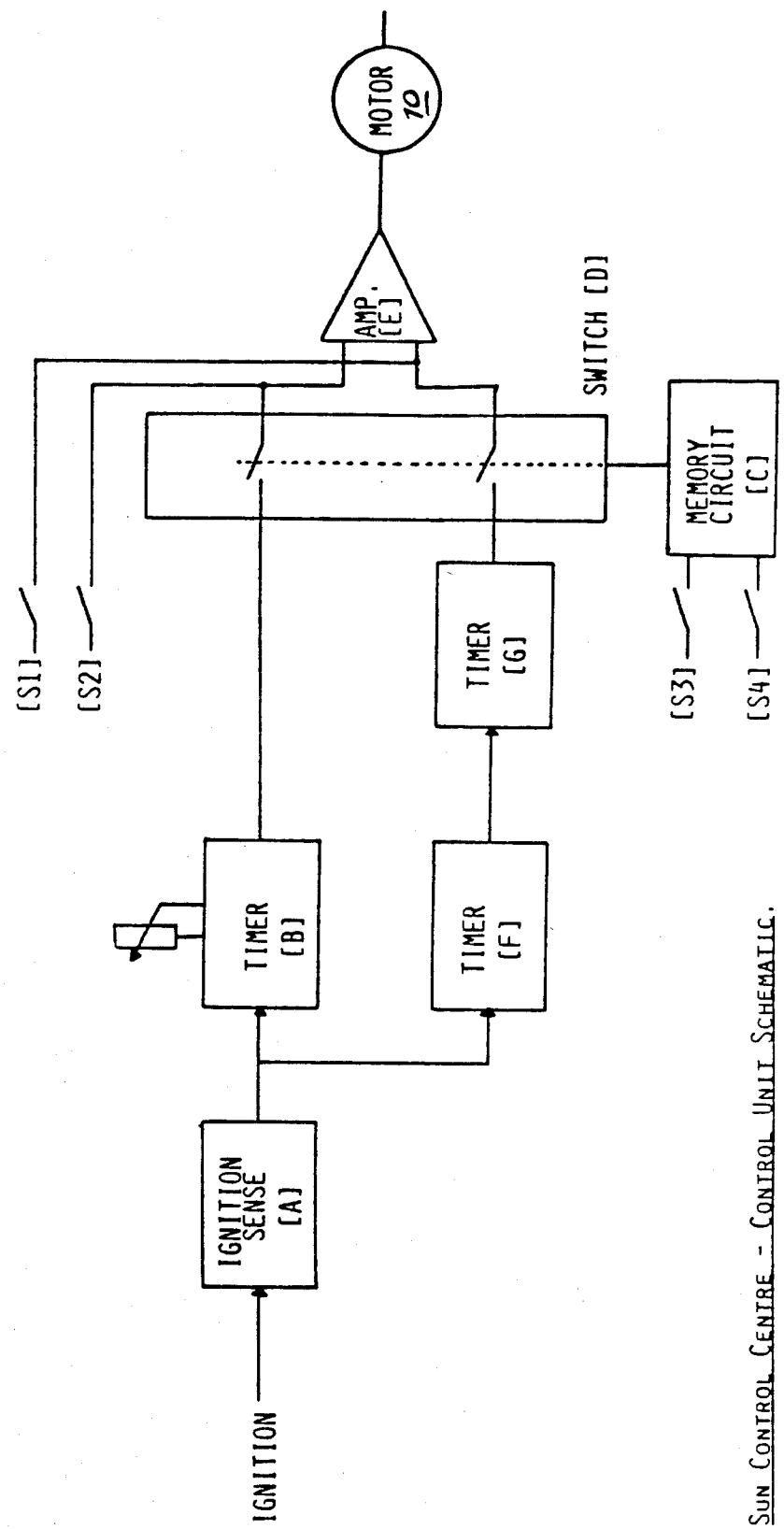
FIG. 7 is a schematic diagram of the automatic control circuitry for the operation of the blind.

The circuitry for the automatic operation of the blind is shown in FIG. 7 and comprises an ignition sense circuit A which triggers an adjustable duration timer B. If memory circuit C is set to allow automatic operation, electronic switch D enables the signal from timer B to control power amplifier E, which passes current to motor 10 for the duration of timer B to open the blind. When the ignition is turned off, circuit A triggers timer circuit F which triggers timer circuit G. If memory circuit C is set to allow automatic operation, electronic switch D enables the signal from timer G to control the power amplifier E which passes current in the reverse direction for the duration of the timer G signal, fully closing the blind. Manual override switches S1 and S2 may be operated at any time to override the automatic control circuitry and permit operation of the blind by switch 16. Switches S3 and S4 set or reset memory circuit C.

I claim:

1. An electrically powered sun blind adapted for use in the rear window of a vehicle, comprising:
   (a) a plurality of parallel slats;
   (b) at least two slat support devices, each of said slat support devices including a pair of rigid parallel side pieces interconnected by a series of slat supporting cross-pieces each supporting a slat and pivotally connected at its ends to said side pieces so that said side pieces are adapted to move relative to one another in parallelogram fashion to establish the angle of said slats, each of said cross-pieces being shaped to cooperate with the next adjacent cross-piece so as to form an integral abutment means to limit the range of angular movement of the blind; and
   (c) an electrically powered motor having a casing and an output shaft rotatably movable with respect to each other, said casing being fixedly connected with a cross-piece of one of said slat support devices and said output shaft being fixedly connected to a fixed mounting of the blind, said relative rotation being parallel to the movement of said slat support device.

2. The sun blind according to claim 1, wherein each cross-piece is generally Z-shaped, the ends of the generally Z-shaped cross-pieces being pivoted to said side pieces and the central member of each Z-shaped crosspiece having a notch at each end to receive and locate the corresponding edge of a slat.

3. The sun blind according to claim 2, wherein each slat includes a pair of coextensive thin metal sections both of which are located in the same cross-pieces, whereby the overall width of the assembly can be adjusted by sliding the two slats relatively to one another in the said notches.

4. The sun blind according to claim 1, which further includes control circuitry including changeover switch means to run the motor in either direction so as to open or close the blind.

5. The sun blind according to claim 4, wherein said control circuitry includes an automatic timer circuit which is connected in use, to the ignition system of the vehicle and is arranged to open the blind automatically when the ignition is switched on, and to close the blind automatically after a predetermined time following the switching off of the ignition, and also including manual override means whereby the blind can be operated by the driver independently of the said automatic circut means.

6. The sun blind according to claim 1, which further includes a slipping overload clutch connected to the output of the motor so that the movement of the blind is stopped when the blind reaches the limits of angular movement thereof.

7. The sun blind according to claim 1, wherein the motor drive is transmitted to the other slat support device by means of a connecting rod.

8. The sun blind according to claim 1, which further includes adjustable mounting means at the lower end thereof, the mounting means including a pivotable joint, whereby the distance of the lower end of the blind from the window can be adjusted.

* * * * *